United States Patent
Okamoto et al.

(10) Patent No.: US 7,063,892 B2
(45) Date of Patent: *Jun. 20, 2006

(54) AROMATIC LIQUID-CRYSTALLINE POLYESTER AND FILM THEREOF

(75) Inventors: Satoshi Okamoto, Tsukuba (JP); Tomoya Hosoda, Ibaraki (JP); Shinji Ohtomo, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/736,635

(22) Filed: Dec. 17, 2003

(65) Prior Publication Data

US 2004/0152865 A1 Aug. 5, 2004

(30) Foreign Application Priority Data

| Dec. 18, 2002 | (JP) | ............................ 2002-366263 |
| Jan. 8, 2003 | (JP) | ............................ 2003-001912 |
| Feb. 12, 2003 | (JP) | ............................ 2003-033319 |

(51) Int. Cl.
| B32B 25/08 | (2006.01) |
| B32B 25/12 | (2006.01) |
| B32B 27/00 | (2006.01) |
| B32B 27/06 | (2006.01) |
| C08G 63/00 | (2006.01) |
| C08F 63/06 | (2006.01) |
| C08F 2/00 | (2006.01) |

(52) U.S. Cl. ................ 428/423.4; 428/423.7; 428/480; 428/495.1; 528/176; 528/180; 528/190; 528/191; 528/193; 528/206; 528/207; 528/212; 528/218; 525/437; 525/444

(58) Field of Classification Search ............ 428/423.7, 428/423.4, 495.1, 480, 424.4; 528/271, 272, 528/206, 176, 180, 190, 191, 193, 207, 212, 528/218; 525/437, 444; 252/299.62
See application file for complete search history.

(56) References Cited

U.S. PATENT DOCUMENTS

| 6,210,872 B1 * | 4/2001 | Hosaki et al. ............... 430/631 |
| 6,656,386 B1 * | 12/2003 | Suenaga et al. ....... 252/299.62 |
| 6,755,991 B1 * | 6/2004 | Kometani et al. ..... 252/299.01 |
| 6,838,546 B1 | 1/2005 | Okamoto et al. |
| 2002/0049270 A1 | 4/2002 | Okamoto et al. |
| 2002/0055607 A1 | 5/2002 | Okamoto et al. |
| 2002/0143135 A1 | 10/2002 | Okamoto et al. |
| 2004/0044171 A1 * | 3/2004 | Okamoto et al. ........... 528/272 |
| 2004/0091686 A1 | 5/2004 | Okamoto et al. |
| 2004/0164282 A1 * | 8/2004 | Okamoto et al. ........... 252/572 |
| 2004/0192858 A1 * | 9/2004 | Katagiri et al. .............. 525/419 |
| 2005/0054811 A1 * | 3/2005 | Ueno et al. .................. 528/272 |

FOREIGN PATENT DOCUMENTS

| EP | 1 319 678 A1 | 6/2003 |
| JP | 05-186614 A | 7/1993 |
| JP | 08-217894 A | 8/1996 |

* cited by examiner

Primary Examiner—Nathan M. Nutter
(74) Attorney, Agent, or Firm—Sughrue Mion, PLLC

(57) ABSTRACT

An aromatic liquid-crystalline polyester having a small dielectric loss in a wide frequency region is provided. An aromatic liquid-crystalline polyester is provided that can manufacture a film having a small volume expansion by heating. An aromatic liquid-crystalline polyester substantially comprising a repeating structural unit originating in 2-hydroxy-6-naphthoic acid 30 to 80 mol %, a repeating structural unit originating in aromatic diol 35 to 10 mol %, and a repeating structural unit originating in aromatic dicarboxylic acid 35 to 10 mol %.

22 Claims, No Drawings

AROMATIC LIQUID-CRYSTALLINE POLYESTER AND FILM THEREOF

FIELD OF THE INVENTION

The present invention relates to an aromatic liquid-crystalline polyester, a film thereof, and a dielectric film.

BACKGROUND OF THE INVENTION

An aromatic liquid-crystalline polyester is broadly used for electronic parts, such as connector, or electronic device due to the low moisture uptake, excellent heat resistance and thin-wall moldability thereof. Moreover, since aromatic liquid-crystalline polyesters have small dielectric loss in a high frequency region, it is utilized for multilayered printed circuit boards for high frequency.

Polyesters having a repeating unit derived from para-hydroxybenzoic acid as a main component have been known as conventional aromatic liquid-crystalline polyesters (EP 1319678 A1). Although aromatic liquid-crystalline polyesters having a repeating unit derived from para-hydroxybenzoic acid as a main component have a small dielectric loss in gigahertz bands, it does not have sufficient dielectric loss in frequency in megahertz bands. Further, conventional aromatic liquid-crystalline polyesters have large volume expansion.

On the other hand, thinner and lighter wiring boards are being required for achieving of improvement in performance, down-sizing, thinner and lighter wiring boards in electronic device. As methods for obtaining thinner and lighter wiring boards, a method of forming a dielectric film on a board by a vapor-depositing method or a sputtering method, and a method (US 2002/049270 A) of coating dielectric substance paste on a substrate to form a dielectric film, are known.

However, a method according to a vapor depositing or a sputtering require high temperature of not less than 500° C. for film forming, and cause degradation of electrode materials by high temperatures.

A method using dielectric substance pastes does not require the above-mentioned high temperature, it does not provide sufficient dielectric loss of a dielectric film.

Objects of the present invention are to provide an aromatic liquid-crystalline polyester having a small dielectric loss in a wide frequency region, and to provide a dielectric substance paste to give dielectric films having small dielectric loss.

SUMMARY OF THE INVENTION

As a result of wholehearted examinations performed by the present inventors, it was found out that an aromatic liquid-crystalline polyester comprising a repeating unit derived from 2-hydroxy-6-naphthoic acid 30 to 80 mol %, a repeating unit derived from aromatic diol 35 to 10 mol %, and a repeating unit derived from aromatic dicarboxylic acid 35 to 10 mol % demonstrates a small dielectric loss in a wide frequency region, and the present invention was completed.

It was furthermore found out that a dielectric substance paste including the aromatic liquid-crystalline polyester, a solvent, and a dielectric substance powder provides a dielectric film with small dielectric loss, leading to completion of the present invention.

That is, the present invention provides an aromatic liquid-crystalline polyester comprising a repeating unit derived from 2-hydroxy-6-naphthoic acid 30 to 80 mol %, a repeating unit derived from aromatic diol 35 to 10 mol %, and a repeating unit derived from aromatic dicarboxylic acid 35 to 10 mol %; and a dielectric substance paste comprising the aromatic liquid-crystalline polyester, a solvent, and a dielectric substance powder, wherein an amount of the aromatic liquid-crystalline polyester is 0.5 to 50% by weight to an amount of a sum of the aromatic liquid-crystalline polyester and the solvent, and an amount of the dielectric substance powder is 0.2 to 200 parts by weight when an amount of a sum of the aromatic liquid-crystalline polyester and the solvent is 100 parts by weight.

DETAILED DESCRIPTION OF PREFERRED EMBODIMENTS

An aromatic liquid-crystalline polyester of the present invention is a thermotropic liquid-crystalline polyester showing optical anisotropy in molten state, and comprising a repeating unit derived from 2-hydroxy-6-naphthoic acid, a repeating unit derived from aromatic diol, and a repeating unit derived from aromatic dicarboxylic acid.

A mole percentage of the repeating unit derived from 2-hydroxy-6-naphthoic acid is 30 to 80 mol % of whole of the aromatic liquid-crystalline polyester, preferably not less than, 35 and not more than 75 mol %, and more preferably not less than, 40 and not more than 70 mol %.

When a mole percentage of the repeating unit derived from 2-hydroxy-6-naphthoic acid is less than 30 mol %, an aromatic liquid-crystalline polyester obtained does not show liquid crystallinity, and when it exceeds 80 mol %, processing of the aromatic liquid-crystalline polyester obtained may be difficult.

As examples of the repeating unit derived from aromatic dicarboxylic acid, there may be mentioned:

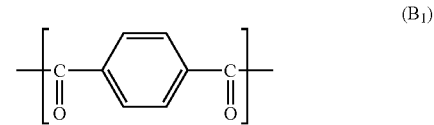

(B₁)

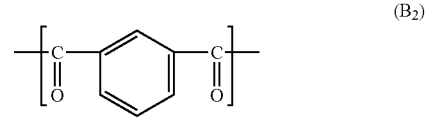

(B₂)

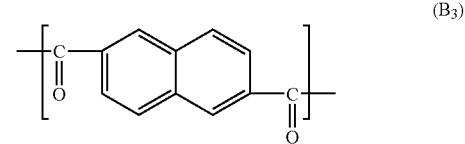

(B₃)

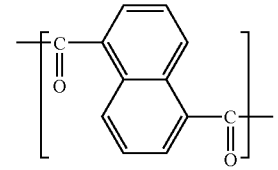

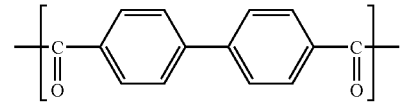

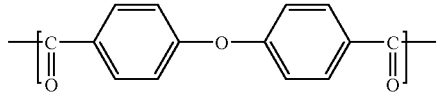

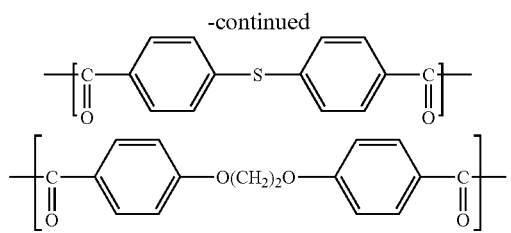

The above-mentioned repeating unit may be substituted by halogen atoms, alkyl groups, or aryl groups.

As alkyl groups, alkyl groups having carbon numbers of 1–10 are preferable, and as aryl groups, aryl groups having carbon numbers of 6 to 20 are preferable.

The repeating unit derived from aromatic dicarboxylic acid is preferably a repeating unit derived from at least one kind of compounds selected from the group consisting of terephthalic acid, isophthalic acid and 2,6-naphthalene dicarboxylic acid.

In view of heat-resistance, an aromatic liquid-crystalline polyester having a repeating unit derived from terephthalic acid, or both repeating units derived from, terephthalic acid and 2,6-naphthalene dicarboxylic acid are more preferable.

In view of low thermal expansion property, an aromatic liquid-crystalline polyester having a repeating unit derived from 2,6-naphthalene dicarboxylic acid is preferable, and in view of solubility to solvents, an aromatic liquid-crystalline polyester having a repeating unit derived from isophthalic acid is preferable.

As examples of the repeating unit derived from aromatic diol, there may be mentioned:

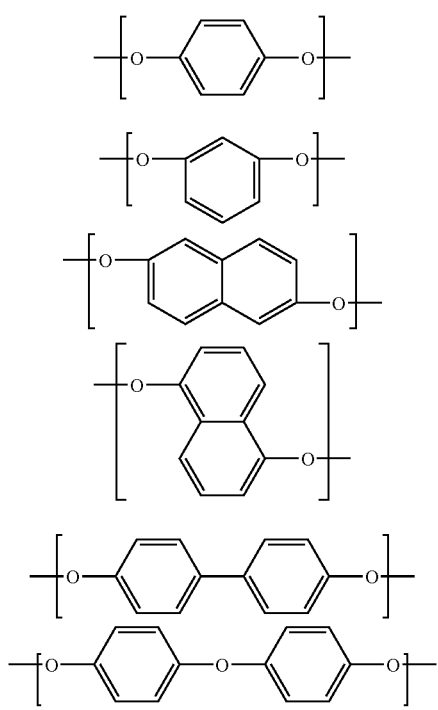

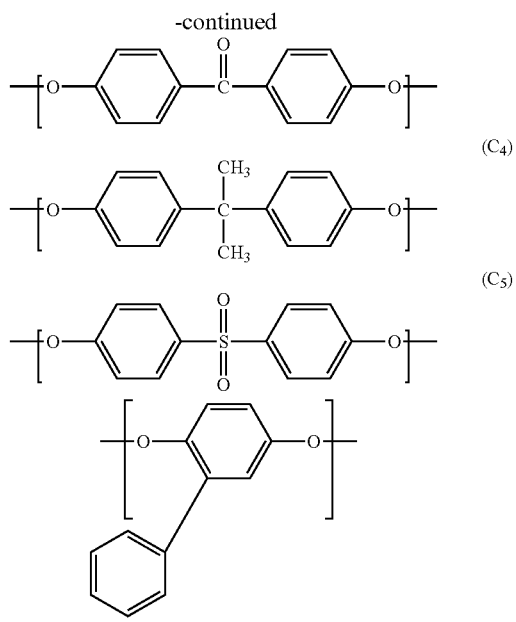

The above-mentioned repeating unit may be substituted by halogen atoms, alkyl groups, or aryl groups.

As alkyl groups, alkyl groups having carbon numbers of 1 to 10 are preferable, and as aryl groups, aryl groups having carbon numbers of 6 to 20 are preferable.

The repeating unit derived from aromatic diols is preferably a repeating unit derived from at least one of compounds selected from the group consisting of hydroquinone, resorcinol, 4,4'-dihydroxybiphenyl, bisphenol A, and bisphenol S, and in view of heat resistance and low thermal expansion property, an aromatic liquid-crystalline polyester having a repeating unit derived from 4,4'-dihydroxybiphenyl is preferable.

A percentage of the repeating unit derived from aromatic dicarboxylic acid is 35 to 10 mol % of whole of the aromatic liquid-crystalline polyester, preferably it is 32.5 to 12.5 mol %, and more preferably 30 to 15 mol %.

A percentage of the repeating unit derived from aromatic diol is 35 to 10 mol % of whole of the aromatic liquid-crystalline polyester, preferably 32.5 to 12.5 mol %, and more preferably 30 to 15 mol %.

Moreover, a molar ratio of the repeating unit derived from aromatic dicarboxylic acid and the repeating unit derived from aromatic diol is preferably 95/100 to 100/95 in view of polymerization degree and mechanical strength.

In an aromatic liquid-crystalline polyester of the present invention, from the view that a low polymerization degree may deteriorate mechanical property, an intrinsic viscosity is preferably not less than 0.3, and more preferably not less than 0.5.

On the other hand, a high polymerization degree may deteriorate workability, resulting from raising a melt viscosity and a solution viscosity intrinsic viscosity is preferably not more than 5, and more preferably not more than 3.3.

In view of balance of mechanical property and workability, the intrinsic viscosity is particularly preferably from 0.5 to 3.

An aromatic liquid-crystalline polyester of the present invention may be manufactured, for example, by condensation polymerization reaction.

Ester forming derivatives of 2-hydroxy-6-naphthoic acid, aromatic diols, and aromatic: dicarboxylic acids may be used for the condensation polymerization reaction.

The ester forming derivatives, for example, include compounds in which a carboxyl group is converted into a group promoting polyester formation reaction and having high reactivity, such as acid chlorides and acid anhydrides, and compounds that form esters with alcohols or ethyleneglycol etc. to form polyesters by ester exchange reaction of carboxyl group.

Furthermore, for example, compounds in which a phenolic hydroxyl group forms esters with carboxylic acids to form polyester by ester exchange reaction may be mentioned.

An example include a method, in which at least one of compounds selected from the group consisting of 2-hydroxy-6-naphthoic acid and aromatic diols are acylated with excessive amount of fatty acid anhydrides to obtain an acylated compound, and then a melt polymerization is performed by ester exchange reaction (condensation polymerization) between the obtained acylated compound and at least one of compounds selected from the group consisting of 2-hydroxy-6-naphthoic acid and aromatic dicarboxylic acid. Fatty acid esters being acylated beforehand may be used as an acylated compound (refer to U.S. 2002/143135 A, and US 2002/055607 A).

In acylation reaction, addition of the fatty acid anhydride is preferably 1.0 to 1.2 times equivalent of the phenolic hydroxyl group, and more preferably 1.05 to 1.1 times equivalent. When an addition of the fatty acid anhydride is less than 1.0 times equivalent, the acylated compound, the 2-hydroxy-6-naphthoic acid, and the aromatic dicarboxylic acid that were sublimated during ester exchange reaction (condensation polymerization) in a line of a reactor and the like may be clogged. When an addition exceeding 1.2 times equivalent may increases coloring of aromatic liquid-crystalline polyester obtained.

The acylation reaction is preferably performed at about 130 to about 180° C. for about 5 minutes to about 10 hours, and more preferably at about 140 to about 160° C. for about 10 minutes to about 3 hours.

Fatty acid anhydrides used for the acylation reaction are not especially limited, and include, for example, acetic anhydride, propionic anhydride, butyric anhydride, isobutyric anhydride, valeic anhydride, pivalic anhydride, 2-ethyl hexanoic anhydride, monochloroacetic acid anhydride, dichloroacetic acid anhydride, trichloroacetic acid anhydride, monobromoacetic acid anhydride, dibromoacetic acid anhydride, tribromoacetic acid anhydride, monofluoroacetic acid anhydride, difluoroacetic acid anhydride, trifluoroacetic anhydride, glutaric anhydride, maleic anhydride, succinic anhydride, beta-bromo propionic anhydride, and the like, and two or more kinds among these compounds may be used in combination. In view of price, and handling property, acetic anhydride, propionic anhydride, butyric anhydride, and isobutyric anhydride are preferable, and acetic anhydride is more preferable.

In ester exchange reaction, an amount of acyl group in acylated compound is preferably 0.8 to 1.2 time equivalents of carboxyl group.

Ester exchange reaction is preferably performed by a temperature rising of about 0.1 to about 50° C./minute at about 130 to about 400° C., and more preferably about 0.3 to about 5° C./minute at about 150 to about 350° C.

In order to move equilibrium in ester exchange reaction between fatty acid ester obtained by acylation and carboxylic acid, a fatty acid as byproduct and an unreacted fatty acid anhydride are preferably distilled off from the system by methods such as evaporation.

Acylation reaction and ester exchange reaction may be performed under existence of catalysts. As the catalysts, catalysts conventionally well-known as catalysts for polymerization of polyester may be used, for example, there may be mentioned: metal salt catalysts such as magnesium acetate, stannous acetate, tetra butyl titanate, lead acetate, sodium acetate, potassium acetate, and antimony trioxide; and organic compound catalysts, such as N,N-dimethyl amino pyridine and N-methyl imidazole.

In these catalysts, heterocyclic compounds including not less than two nitrogen atoms such as N,N-dimethyl amino pyridine and N-methyl imidazole, may preferably be used (US 2002/055607 A).

The catalyst is usually introduced at the time of charging of monomers, and is not necessarily removed after acylation, and when the catalyst is not removed, ester exchange reaction may successfully be performed.

Condensation polymerization by ester exchange is usually performed by melt polymerization, and melt polymerization and solid-state polymerization may be used in combination. Specifically, in solid-state polymerization a polymer is removed from a melt polymerization process, and then is ground to obtain the polymer in a shape of powder or flake. Subsequently the polymer obtained is preferably polymerized by well-known solid-phase polymerization methods.

In detail, a method includes a method in which heat-treating in a state of solid phase is performed under inert ambient atmospheres, such as nitrogen, at about 20 to about 350° C. and for about 1 to about 30 hours, and the like. The solid-phase polymerization may be performed, with agitation or without agitation in a state of still standing. Moreover, a same reaction vessel having suitable agitating mechanism may serve as both of a melt polymerization vessel and a solid-phase polymerization vessel. After solid-phase polymerization, the obtained liquid-crystalline polyester may be pelletized and may be molded by well-known methods.

Manufacture of the aromatic liquid-crystalline polyester may be performed using a batch operation apparatus, continuous apparatus, and the like.

Polymers obtained by the above-mentioned steps is decomposed with, for example, amines etc, then compound obtained by the decomposition is identified and quantified with NMR to determine compositions and composition ratios.

Fillers, additives, and the like, may be added to an aromatic liquid-crystalline polyester of the present invention in a range not impairing objects of the present invention.

Fillers include, for example, organic fillers, such as epoxy resin powder, melamine resin powder, urea resin powder, benzoguanamine resin powder, polyester resin powder, and styrene resin; and inorganic fillers, such as silica, alumina, titanium oxide, zirconia, kaolin, calcium carbonate, and calcium phosphate etc.

Additives include, coupling agents, sedimentation inhibitors, UV absorbents, heat stabilizers, and the like.

An aromatic liquid-crystalline polyester of the present invention may be added one or two or more kinds of thermoplastic resins such as polypropylene, polyamide, polyester, polyphenylene sulfide, polyether ketone, polycarbonate, polyethersulfone, polyphenylether and modified compounds thereof, and polyether imides; and elastomers, such as copolymers of glycidyl methacrylate and polyethylene and the like, in range not impairing objects of the present invention.

Films comprising an aromatic liquid-crystalline polyester of the present invention may be manufactured using, for example, a method in which the aromatic liquid-crystalline polyester is molten to form a film (hereinafter referred to as melting method), a method in which the aromatic liquid-crystalline polyester is dissolved in an organic solvent, a solution obtained is cast, and subsequently an organic solvent is removed (hereinafter referred to as solution-casting method) and the like.

As films obtained by the melting method, there may be mentioned a uniaxially oriented film or a biaxially oriented film, or the like obtained by a method that the aromatic liquid-crystalline polyester is molten and kneaded with an extruding machine, and a molten resin extruded out through a T die is rolled up while being stretched in a mechanical direction (longitudinal direction) of a rolling up machine.

Conditions of the extruding machine for producing a uniaxial oriented film are suitably determined according to a monomer composition of the aromatic liquid-crystalline polyester, and preset temperatures of a cylinder are usually in a range of about 200 to about 400° C., and preferably about 230 to about 380° C.

Slit gaps of the T die are usually in a range of about 0.1 to about 2 mm. In a case of uniaxial oriented film, a range of draft ratios is preferably 1.1 to 45. A draft ratio here represents a value obtained by dividing a cross section of the T die slit with a film cross section vertical to a direction of MD. A draft ratio less than 1.1 may not give a sufficient film strength, and a draft ratio exceeding 45 may not give sufficient surface smoothness of the film. The draft ratio may be adjusted by setting conditions and rolling up speeds of the extruding machine.

In case of biaxially-oriented film, a cylinder temperature, and a slit gap of a T die of an extruding machine are usually almost same as the above-mentioned conditions. A biaxially-oriented film may be obtained by a method in which a molten sheet extruded from the T die is simultaneously stretched in a longitudinal direction and in a vertical direction to a direction of MD (that is TD direction), or by a sequential stretching method in which a molten sheet extruded from the T die is firstly stretched in a direction of MD, and the stretched obtained sheet is subsequently stretched in a direction of TD using a tenter at a high temperature of about 100 to about 400° C. within the process, or the like.

A stretch ratio for the biaxially-oriented film is preferably in a range of about 1.1 to about 20 times in a direction of MD, and in a range of about 1.1 to about 20 times in a direction of TD. If a stretch ratio is outside the above-mentioned range strength of the film obtained may not be sufficient, or thickness thereof may not be uniform.

An tubular film may also be obtained by forming a film of molten sheet extruded from a cylindrical die with tubular film process.

The tubular film may be manufactured by following methods.

An aromatic liquid-crystalline polyester of the present invention is supplied to a melt kneading extruding machine equipped with a die of annular slits, and a cylinder preset temperature is set usually at about 200 to about 400° C., and preferably at about 230 to about 380° C. to perform melt kneading. A cylindrical aromatic liquid-crystalline polyester film is extruded from an annular slit of the extruding machine in upper direction or lower direction. A gap of the annular slit is usually about 0.1 to about 5 mm, and preferably about 0.2 to about 2 mm, and a diameter of the annular slit is usually about 20 to about 1000 mm, and preferably about 25 to about 600 mm.

The molten and extruded cylindrical resin film was drafted in a direction of MD, and air or inert gas such as, nitrogen gas is blown from inside of the cylindrical molten resin film for inflation. Thereby the film is inflated and stretched in both direction of TD and MD.

A blowup ratio (a ratio of a diameter of a final tube, and a diameter of a initial stage tube) is preferably about 1.5 to about 10, and an MD stretching ratio is preferably about 1.5 to about 40. If the ratio is outside the above-mentioned range, an aromatic liquid-crystalline polyester film without wrinkling and with uniform thickness and high strength may not be obtained.

The film inflated and stretched is air-cooled or water-cooled and, subsequently taken up after passage of nip rolls.

In a tubular film forming, conditions are preferably selected for inflation of a cylindrical molten film so that it may have a uniform thickness and a flat and smooth surface state.

When an aromatic liquid-crystalline polyester film is manufactured by the solution-casting method, organic solvents to be used are not especially limited, as long as they may dissolve the aromatic liquid-crystalline polyester. From the viewpoint where the aromatic liquid-crystalline polyester is dissolved, at normal temperatures or at elevated temperatures, solvents including phenol compounds shown by a following general formula (I) are preferably used. Its content is preferably not less than 30% by weight.

Moreover, from the viewpoint where the aromatic liquid-crystalline polyester is dissolved at comparatively low temperatures, solvents including phenol compounds (I) of not less than 60% by weight is more preferable, and furthermore, a solvent of substantially 100% by weight of phenol compound (I) is still more preferably used.

Where, A represents a hydrogen atom, a halogen atom, or a tri halogenated methyl group, and i represents an integer of 1 to 5. When i is not less than 2, a plurality of A may be mutually identical, or may be different from each other, but they are preferably identical.

From the viewpoint where aromatic liquid-crystalline polyester is dissolved at comparatively low temperatures, phenol compounds as organic solvents are preferably halogen substituted phenol compounds shown by a following general formula (II). Its content is preferably not less than 30% by weight. Solvents including the halogen substituted phenol compounds (II) of not less than 60% by weight is more preferable, and a solvent of substantially 100% by weight of the halogen substituted phenol compounds (II) is still more preferable.

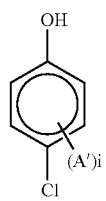

(II)

Where, A' represents a hydrogen atom, a halogen atom, or a tri halogenated methyl group, and i represents an integer of 1–5. When i is not less than two, a plurality of A may be mutually identical, or may be different from each other, but they are preferably identical.

Halogen atoms include a fluorine atom, a chlorine atom, a bromine atom, and an iodine atom, and a fluorine atom and a chlorine atom are preferable.

Examples of general formula (I) whose halogen atom is a fluorine atom include pentafluorophenol and tetrafluorophenol.

Examples of general formula (I) whose halogen atom is a chlorine atom include o-chlorophenol and p-chlorophenol, and in the light of solubility, p-chlorophenol is preferable.

Halogen of tri halogenated methyl group include fluorine atom, chlorine atom, bromine atom, and iodine atom.

An example of general formula (I) whose halogen of tri halogenated methyl group includes a fluorine atom, 3,5-bis trifluoromethyl phenol.

In the light of price and availability, solvents including chlorine substituted phenol compounds, such as o-chlorophenol and p-chlorophenol may be preferably used, and in the light of solubility, solvents including p-chlorophenol may be more preferably used.

The p-chlorophenol may further have substituents, and phenol compounds shown by the above-mentioned general formula (II) are preferable in the light of price and availability.

Halogen substituted phenol compounds (II) include, for example, 2,4-dichlorophenol, 3,4-dichlorophenol, 2,4,5-trichlorophenol, 2,4,6-trichlorophenol, pentachlorophenol, and 2,4-dichlorophenol, 3,4-dichlorophenol may preferably be used among them.

Solvents used in the present invention may include other components in addition to halogen substituted phenol compounds, so long as they do not precipitate the aromatic liquid-crystalline polyester at the time of conservation or below-mentioned flow casting of solution.

Other components that may be included are not especially limited and include, for example, chloride compounds, such as chloroform, methylene chloride, and tetrachloroethane may be mentioned.

An amount of an aromatic liquid-crystalline polyester is preferably 0.1 to 100 parts by weight to a solvent 100 parts by weight including organic solvents, for example, a solvent containing phenol compounds of not less than 30% by weight, and it is more preferably 0.5 to 50 parts by weight in the light of workability or economical efficiency and, it is still more preferably 1–10 parts by weight. If, an amount is less than 0.1 part by weight, productive efficiency may be reduced, and if an amount exceeds 100 parts by weight, a dissolved aromatic liquid-crystalline polyester may not be present.

In a solution-casting method, a solution in which the aromatic liquid-crystalline polyester is dissolved in an organic solvent is filtrated with a filter to remove minute foreign matters included in the solution, if needed, and then the solution is uniformly flown so that it may have a flat surface on a base material by various methods, such as a roller coating method, a dip coating method, a spray coating method, a spinner coating method, a curtain coating method, a slot coating method, and a screen printing method. Subsequently, the organic solvent is removed to obtain an aromatic liquid-crystalline polyester film.

A method of removing of the organic solvent is not especially limited, and it is preferable to be carried out by evaporation of the solvent. Methods such as heating, pressure reduction, and ventilation, may be mentioned as a method of evaporating solvents. In the light of productive efficiency and handling property, evaporation accompanied by heating is preferable, and evaporation accompanied by ventilation and heating is more preferable. A heating condition preferably includes a preliminary drying process at about 80 to about 100° C. for about 30 minutes to about 2 hours and a main heat treatment process at about 180 to about 300° C. for about 30 minutes to about 4 hours.

A thickness of the aromatic liquid-crystalline polyester film thus obtained is not especially limited, and in the light of film-forming property or mechanical property, it is preferably about 0.5 to about 500 μm, and in the light of handling property, more preferably about 1 to about 100 μm.

A metal layer may also be laminated to the aromatic liquid-crystalline polyester film.

In lamination of the metal layer, in order to improve adhesive strength to a surface to be laminated with a metal layer of the aromatic liquid-crystalline polyester film, a corona discharge treatment, an ultraviolet ray irradiation process, or a plasma treatment may preferably performed.

As methods of laminating metal layers to an aromatic liquid-crystalline polyester film of the present invention, following methods may be mentioned.

(1) A method in which the aromatic liquid-crystalline polyester is dissolved in an organic solvent to obtain an aromatic liquid-crystalline polyester solution, then the solution being filtrated with a filter, if needed, to remove minute foreign matters included in the solution, the obtained solution being uniformly flown on a metallic foil so that it may have a flat surface, using various means, such as, a roller coating method, a dip coating method, spray coating method, a spinner coating method, a curtain coating method, a slot coating method, and a screen printing method, etc., and subsequently an aromatic polyester film obtained by removing an organic solvent being laminated with a metallic foil.

(2) A method in which the aromatic polyester film obtained by the above mentioned melting cast method is attached on a metallic foil by thermal press.

(3) A method in which the aromatic liquid-crystalline polyester film obtained by the above mentioned melting cast method is attached on a metallic foil with an adhesive.

(4) A method in which a metal layer is formed by vapor deposition on the aromatic polyester film obtained by the above mentioned melting cast method.

The method of (1) is preferable, in the light of easily obtaining a laminated body having a higher adhesive strength with a metallic foil and a more uniform film thickness.

The method of (2) is also preferable, in the light of more easily adhering by pressure the aromatic liquid-crystalline polyester film to a metallic foil at a temperature close to a flow starting temperature using a heating roller or a pressing machine.

In the method of (3), adhesives used are not especially limited, and include, for example, hot melt adhesives, polyurethane adhesives. Especially, ethylene copolymers including epoxy groups etc. are preferably used as adhesives.

In the method of (4), methods of vapor-depositing metal is not especially limited, and include, for example, an ion beam sputtering method, a high-frequency sputtering method, a direct current magnetron sputtering method, a glow discharge method, etc. may be mentioned. Especially, a high-frequency sputtering method is preferably used. Metals used for the metal layer in the present invention include, for example, gold, silver, copper, nickel, and aluminum. For usage of tab tapes and printed circuits, copper is preferable, and aluminum is preferable for usage of capacitors.

Structures of thus obtained laminated article include, for example, a two-layered structure of the aromatic liquid-crystalline polyester film and a metal layer; a three-layered structure obtained by laminating a metal layer to both surfaces of the aromatic liquid-crystalline polyester film; and a five-layered structure obtained by alternately laminating the aromatic liquid-crystalline polyester film and a metal layer, and the like.

Moreover, heat treatment may be provided to the laminated article for the purpose of high intensity expression, if needed.

Next, descriptions will be provided about a dielectric substance paste of the present invention.

A dielectric substance paste of the present invention comprises an aromatic liquid-crystalline polyester, a solvent, and a dielectric substance powder.

An aromatic liquid-crystalline polyester may include repeating units mentioned above, or may further include repeating units shown by a following general formula (III) in addition to the above-mentioned repeating units.

(III)

Where, $X_4$ represents phenylene group.

In the aromatic liquid-crystalline polyester, when the above-mentioned repeating unit (III) is not included, an amount of each repeating unit is the same as the above-mentioned when the repeating unit (III) is included, an amount of a repeating unit derived from 2-hydroxy-6-naphthoic acid is preferably 40 to 75 mol %, an amount of a repeating unit derived from aromatic dicarboxylic acid is preferably 12.5 to 30 mol %, an amount of a repeating unit derived from aromatic diol acid is preferably 12.5 to 30 molt, and an amount of a repeating unit (III) is preferably not more than 5 mol %. And an amount of the repeating unit derived from 2-hydroxy-6-naphthoic acid is more preferably 40 to 65 mol %, more preferably an amount of the repeating unit derived from aromatic dicarboxylic acid is 17.5 to 30 mol %, an amount of the repeating unit derived from aromatic diol acid is 17.5 to 30 mol %, and an amount of the repeating unit (III) is not more than 5 mol %. Furthermore, still more preferably an amount of the repeating unit derived from 2-hydroxy-6-naphthoic acid is 45 to 55 mol %, an amount of the repeating unit derived from aromatic dicarboxylic acid is 22.5 to 27.5 mol %, an amount of the repeating unit derived from aromatic diol acid is 22.5 to 27.5 mol %, and an amount of the repeating unit is not more than 5mol %.

A content of the dielectric substance powder is 0.2 to 200 parts by weight, when an amount of sum of the aromatic liquid-crystalline polyester and a solvent is 100parts by weight, preferably 5 to 100 parts by weight, and more preferably 5 to 50 parts by weight.

A content less than 0.2 part by weight do not provide enough addition effects of the dielectric substance powder, and a content exceeding 200 parts by weight provides a low film strength.

A particle diameter of the dielectric substance powder preferably 0.1 to 20 µm, and more preferably 0.1 to 10 µm.

The dielectric substance powder is not especially limited, and include, for example, powders having not less than 5 of dielectric constant, that is: titanic acids such as barium titanate, strontium titanate, solid solution of barium titanate and strontium titanate, and lead titanate; lead zirconate titanate, tantalum nitride, lithium tantalate, strontium-barium niobate, lead germanate, glycine trisulfide, lead germanate-barium-tantalum oxide, tantalum oxide nitride, alumina, aluminium nitride, silicon carbide, and the like.

They may be used independently, or two or more kinds may be used in combination.

Especially, at least one of powder selected from the group consisting of barium titanate, strontium titanate, solid solution of barium titanate and strontium titanate, and tantalum oxide are preferable.

A content of the aromatic liquid-crystalline polyester is 0.5 to 50% by weight to an amount of sum total of the aromatic liquid-crystalline polyester and a solvent, preferably 3 to 20% by weight, and more preferably 5 to 10% by weight.

When a content is less than 0.5% by weight, only an excessive thin film of dielectric substance is obtained by one application, and repeated application is required, and productivity is decreased. When a content exceeds 50% by weight, whole quantity of the aromatic liquid-crystalline polyester is not completely dissolved, and addition of the dielectric substance powder causes a high paste viscosity, leading to decrease in coating property.

Into a dielectric substance paste of the present invention, there may be added one, or two or more kinds of: inorganic fillers, such as silica, aluminium hydroxide, and calcium carbonate; organic fillers, such as cured epoxy resins, cross-linked benzoguanamine resins, and cross-linked acrylics polymers; thermoplastic resins, such as polyamides, polyesters, polyphenylene sulfides, polyether ketones, polycarbonates, polyethersulfones, polyphenylethers and modified derivatives thereof, and polyether imides; thermosetting resin, such as phenol resin, epoxy resin, polyimide resin, and cyanate resins; various additives, such as silane coupling agents, antioxidants, and UV absorbents, in range not impairing effect of the present invention.

Even in the case where the dielectric substance powder is included at a high solid content ratio, for example, a content of not less than 20% by weight to a whole amount of the paste, the dielectric substance paste of the present invention enables coating with a low viscosity, which is preferable.

A preparation method of the dielectric substance paste of the present invention is not especially limited, and include for example, a method in which an aromatic liquid-crystalline polyester is dissolved in a solvent, to obtain an aromatic polyester solution, and then a dielectric substance powder is added into the obtained solution.

A dielectric film may be obtained by coating a dielectric substance paste of the present invention on a substrate.

For example, a dielectric substance paste of the present invention is filtrated with a filter etc. if needed, and minute foreign matters included in the dielectric substance paste are removed, coated to a substrate, and subsequently a solvent is removed to obtain a desired dielectric film.

Although a suitable viscosity of the dielectric substance paste used differs according to application methods, it is preferably 0.1 poise to 200 poises, and more preferably 0.5 poise to 30 poises.

Application method is not especially limited, and include for example, methods such as a spin coating method, a bar coating method, and a spray coating method, may be adopted.

A method of solvent removal is not especially limited, and it is preferably carried out by evaporation of the solvent.

Methods, such as heating, pressure reduction, and ventilation, maybe mentioned as a method of evaporating solvent. In the light of productive efficiency and handling property, evaporation accompanied by heating is preferable, and evaporation accompanied by ventilation and heating is more preferable among them.

A heating temperature is usually about 100 to about 150° C.

Heat treatment may further be conducted to the obtained dielectric film, if needed.

Temperatures of the heat treatment are usually in a range about 200 to about 400° C.

Although thickness of a dielectric film is varied depending on usage, it is preferably 0.5 μm to 500 μm, and it is more preferably 1 μm to 100 μm.

In addition, a substrate to be used is not especially limited, and include, for example, substrates that are obtained by impregnating glass fibers into epoxy resins to be used for printed circuit boards, and BT substrate (made by Mitsubishi Gas Chemical Co., Inc.), and the like.

Moreover, the dielectric film may also be obtained in a way in which a dielectric substance paste of the present invention is coated on a supporting medium, having a uniform and flat surface, comprising Teflon (R), a metal, a glass, and the like, and the solvent is evaporated off, and the film is then separated off the supporting medium.

Since the above-mentioned dielectric substance paste has a low dielectric loss, a low viscosity, and easy coating property even if a dielectric substance powder is included by a high solid content ratio, a dielectric film may be obtained with sufficient productivity using the dielectric substance paste.

Since the obtained dielectric film has a flat and smooth surface and a uniform film thickness and, in addition, has uniformity, a high dielectric constant, and a small dielectric loss, it may suitably be used for usages, such as boards including passive elements and active elements therein.

EXAMPLES

The present invention will, hereinafter, be described with reference to Examples, but the present invention is not limited by the Example.

Manufacturing Example 1

Into a reactor equipped with an agitating mechanism, a torque meter, a nitrogen gas inlet tube, a thermometer, and a reflux condenser, 2-hydroxy-6-naphthoic acid 752.72 g (4.00 moles), hydroquinone 220.22 g (2.00 moles), 2,6-naphthalene dicarboxylic acid 432.38 g (2.00 moles), acetic anhydride 986.19 g (9.2 moles), and 1-methyl imidazole 0.143 g as a catalyst were introduced. After agitation for 15 minutes, a temperature was raised while being agitated. When the internal temperature reached 145° C., agitation was continued for 1 hour, with the same temperature held.

Next, while evaporating off a distilling by product of acetic acid and unreacted acetic anhydride, the temperature was raised over 3 hours from 145° C. to 310° C. Subsequently, after further adding 1-methyl imidizaole 1.427 g, the reactor was kept warm at the same temperature for 30 minutes, and an aromatic polyester was obtained. The obtained aromatic polyester was cooled to a room temperature, and was ground with a grinder to obtain a powder of the aromatic polyester (a particle diameter approximately 0.1 mm to approximately 1 mm).

The powder obtained above was heated over 1 hour from 25° C. to 250° C., and is further heated over 5 hours from the same temperature to 320° C. Subsequently, the powder was kept at the same temperature for 3 hours to perform solid phase polymerization. Subsequently, the powder after solid phase polymerization was cooled and the powder (aromatic polyester) after cooled was measured for a fluid initiation temperature using a flow tester [made by Shimadzu Corp. "CFT-500 type"] to obtain a value of 333° C.

Manufacturing Example 2

Into a reactor equipped with an agitating mechanism, a torque meter, a nitrogen gas inlet tube, a thermometer, and a reflux condenser, 2-hydroxy-6-naphthoic acid 191.8 g (1.02 moles), 4,4'-dihydroxybiphenyl 63.3 g (0.34 moles), isophthalic acid 56.5 g (0.34 moles), and acetic anhydride 191 g (1.87 moles) were introduced. After an air in the reactor was substituted with enough nitrogen gas, the temperature was raised to 150° C. over 15 minutes under nitrogen gas flow, and reflux was performed for 3 hours while temperature being held.

Subsequently, the temperature was raised to 320° C. over 170 minutes, while evaporating off a distilling byproduct of acetic acid and unreacted acetic anhydride. When increase in torque was recognized, it was determined as reaction termination, and then the content was removed out. The obtained solid content was cooled to a room temperature, and after grinding with a coarse grinder, it was held at 250° C. under nitrogen atmosphere for 10 hours to progress solid-state polymerization reaction. The obtained aromatic liquid-crystalline polyester was dissolved in p-chlorophenol, and measured for an intrinsic viscosity at 60° C. to obtain a result of 2.1.

Manufacturing Example 3

Into a reactor equipped with an agitating mechanism, a torque meter, a nitrogen gas inlet tube, a thermometer, and a reflux condenser, p-hydroxybenzoic acid 140.8 g (1.02 moles), 4,4'-dihydroxy biphenyl 63.3 g (0.34 mols), isophthalic acid 56.5 g (0.34 moles), and acetic anhydride 191 g (1.87 moles) were introduced. After an air in the reactor was substituted with enough nitrogen gas, the system temperature was raised to 150° C. over 15 minutes under nitrogen gas flow, and reflux was performed for 3 hours while temperature being held.

Subsequently, the system temperature was raised to 320° C. over 170 minutes, while evaporating off a distilling by product of acetic acid and unreacted acetic anhydride. When increase in torque was recognized, it was determined as reaction termination, and then the content was removed out. A solid content was cooled to a room temperature, and after grinding with a coarse grinder, it was held at 250° C. under nitrogen atmosphere for 10 hours to progress solid-state polymerization reaction. The obtained aromatic liquid-crystalline polyester was dissolved in p-chlorophenol, and measured for an intrinsic viscosity at 60° C. to obtain a result of 1.5.

Manufacturing Example 4

Into a reactor equipped with an agitating mechanism, a torque meter, a nitrogen gas inlet tube, a thermometer, and a reflux condenser, 2-hydroxy 6-naphthoic acid 564.54 g (3.00 moles), 4,4'-dihydroxybiphenyl 279.32 g (1.50 moles), 2,6-naphthalene dicarboxylic acid 324.49 g (1.50 moles), acetic anhydride 704.42 g (6.90 moles), and 1-methyl imidazole 0.117 g as a catalyst were introduced. After agitating for 15 minutes at a room temperature, a temperature was raised while being agitated. When an internal temperature reached 145° C., agitation being continued for 1 hour with the same temperature held, and 1-methyl imidazole 1.170 g as a catalyst was further added.

Subsequently, the temperature was raised from 145° C. to 310° C. over 3 hours, while evaporating off a distilling byproduct of acetic acid and unreacted acetic anhydride. The same temperature was held for 2 hours and 30 minutes, and an aromatic liquid-crystalline polyester was obtained. The obtained aromatic polyester was cooled to a room temperature, and was ground with a grinder to obtain a powder of the aromatic liquid-crystalline polyester (a particle diameter approximately 0.1 mm to approximately 1 mm).

The powder obtained above was heated over 1 hour from 25° C. to 250° C., and is further heated over 8 hours from the same temperature to 320° C. Subsequently, it was kept at the same temperature for 5 hours to perform solid-phase polymerization. Subsequently, the powder after solid phase polymerization was cooled and the powder after cooling (aromatic polyester) was measured for a fluid initiation temperature using a flow tester [made by Shimadzu Corp. "CFT-500 type"] to obtain a value of 326° C.

Manufacturing Example 5

Into a reactor equipped with an agitating mechanism, a torque meter, a nitrogen gas inlet tube, a thermometer, and a reflux condenser, p-hydroxybenzoic acid 911 g (6.6 moles), 4,4'-dihydroxy biphenyl 409 g (2.2 moles), terephthalic acid 274 g (1.65 moles), isophthalic acid 91 g (0.55 moles), and acetic anhydride 1235 g (12.1 moles) were introduced. After an air in the reactor was substituted with enough nitrogen gas, the temperature was raised to 150° C. over 15 minutes under nitrogen gas flow, and reflux was performed for 3 hours while temperature being held.

Subsequently, the temperature was raised to 320° C. over 2 hours and 50 minutes, while evaporating off a distilling byproduct of acetic acid and unreacted acetic anhydride. When increase in torque was recognized, it was determined as reaction termination, and then the content was removed out. The obtained solid content was cooled to a room temperature, and after grinding with a coarse grinder, a temperature was raised over 1 hour from a room temperature to 250° C. under nitrogen atmosphere, further raised from 250° C. to 290° C. over 5 hours, and, subsequently the temperature was held at 290° C. for 3 hours to progress solid-state polymerization reaction. Subsequently, the powder after solid-phase polymerization was cooled and the powder after cooling (aromatic liquid-crystalline polyester) was measured for a fluid initiation temperature using a flow tester [made by Shimadzu Corp. "CFT-500 type"] to obtain a value of 336° C.

Manufacturing Example 6

Into a reactor equipped with an agitating mechanism, a torque meter, a nitrogen gas inlet tube, a thermometer, and a reflux condenser, 2-hydroxy-6-naphthoic acid 256 g (1.36 moles), 4,4'-dihydroxybiphenyl 63.3 g (0.34 moles), isophthalic acid 56.5 g (0.34 moles), and acetic anhydride 229 g (2.24 moles) were introduced. After an air in the reactor was substituted with enough nitrogen gas, the temperature was raised to 150° C. over 15 minutes under nitrogen gas flow, and reflux was performed for 3 hours while the temperature being held. Subsequently, the temperature was raised to 320° C. over 170 minutes, while evaporating off a distilling byproduct of acetic acid and unreacted acetic anhydride. When increase in torque was recognized, it was determined as reaction termination, and then the content was removed out. The obtained solid content was cooled to a room temperature, and after grinding with a coarse grinder, it was held at 250° C. for 3 hours under nitrogen atmosphere to progress solid-state polymerization reaction.

Manufacturing Example 7

Into a reactor equipped with an agitating mechanism, a torque meter, a nitrogen gas inlet tube, a thermometer, and a reflux condenser, 2-hydroxy 6-naphthoic acid 256 g (1.36 moles), 4,4'-dihydroxybiphenyl 63.3 g (0.34 moles), isophthalic acid 56.5 g (0.34 mols), and acetic anhydride 229 g (2.24 mols) were introduced. After an air in the reactor was substitute with enough nitrogen gas, the temperature was raised to 150° C. over 15 minutes under nitrogen gas flow, and reflux was performed for 3 hours while temperature being held. Subsequently, the temperature was raised to 320° C. over 170 minutes, while evaporating off a distilling byproduct of acetic acid and unreacted acetic anhydride. When increase in torque was recognized, it was determined as reaction termination, and then the content was removed out. The obtained solid content was cooled to a room temperature, and after grinding with a coarse grinder, it was held at 250° C. for 3hours under nitrogen atmosphere to progress solid-state polymerization reaction.

Example 1

A powder of resin obtained in Manufacturing example 1 was compressed at 310° C. for 10 minutes under a load of 100 kgf to obtain a test piece having a thickness of 2 mm. A test piece thus obtained was measured for a dielectric constant and a dielectric loss using an impedance material analyzer made by Hewlett-Packard Co. Table 1 shows the results.

Example 2

A powder of resin obtained in Manufacturing example 2 was compressed at 290° C. for 10 minutes under a load of 100 kgf to obtain a test piece having a thickness of 2 mm. A test piece thus obtained was measured for a dielectric constant and a dielectric loss using an impedance material analyzer made by Hewlett-Packard Co. Table 1 shows the results.

Comparative Example 1

A powder of resin obtained in Manufacturing example 3 was compressed at 290° C. for 10 minutes under a load of 100 kgf to obtain a test piece having a thickness of 2 mm.

A test piece thus obtained was measured for a dielectric constant and a dielectric loss using an impedance material analyzer made by Hewlett-Packard Co. Table 1 shows the results.

Example 3

The aromatic liquid-crystalline polyester obtained in Manufacturing example 1 was molten within a single screw extruding machine (50 mm of a diameter of a screw) was extruded in a shape of a film under a condition of a draft ratio 4 from a T die (a lip length of 300 mm, a lip clearance of 1 mm, a die temperature of 360° C.) of the extruding machine and then cooled to obtain a film with a thickness of 250 μm.

Example 4

The aromatic liquid-crystalline polyester powder 1 g obtained in Manufacturing example 2 was added to p-chlorophenol 9 g, and the mixture was heated to 120° C. As a result, it was confirmed that the powder was dissolved thoroughly to provide a transparent solution. The solution was agitated, and degassed to obtain an aromatic liquid-crystalline polyester solution. The obtained solution was bar-coated on a glass plate, and subsequently, the glass plate was heat-treated for 1 hour at 100° C., and further for 1 hour at 250° C. It was separated from the glass plate to obtain a film.

Example 5

The aromatic liquid-crystalline polyester powder 1 g obtained in Manufacturing example 2 was added to p-chlorophenol 9 g, and the mixture was heated to 120° C. As a result, it was confirmed that the powder was dissolved thoroughly to provide a transparent solution. The solution was agitated, and degassed to obtain an aromatic liquid-crystalline polyester solution. The obtained solution was bar-coated on the surface of a copper foil mat having a thickness of 18 μm, and subsequently, the copper foil mat was heat-treated for 1 hour at 100° C., and further for 1 hour at 250° C. The copper foil was measured for a 90-degree peel strength to obtain a result of 0.8 N/mm.

TABLE 1

| Dielectric property | | Example 1 | Example 2 | Comparative example 1 |
|---|---|---|---|---|
| Dielectric constant | 1 MHz | 2.99 | 3.05 | 3.31 |
| | 10 MHz | 2.97 | 3.03 | 3.21 |
| | 100 MHz | 2.94 | 3.01 | 3.15 |
| | 1 GHz | 2.92 | 2.98 | 3.10 |
| Dielectric loss | 1 MHz | 0.0062 | 0.0053 | 0.015 |
| | 10 MHz | 0.0038 | 0.0028 | 0.012 |
| | 100 MHz | 0.0028 | 0.0021 | 0.007 |
| | 1 GHz | 0.0010 | 0.0011 | 0.004 |

Example 6

A powder of resin obtained in Manufacturing example 4 was beforehand dried at 120° C. for 4 hours, and a dry resin was obtained. The dried resin was pelletized at 320° C. using a twin screw extruder (made by Ikegai Ltd. PCM-30). The obtained pellet was measured for a specific volume at 0.1 MPa using a PVT measuring machine. Volume expansion was calculated from the specific volume at each temperature of 100, 150, 200, 250, 300° C. on the basis of specific volume at 50° C. Table 2 shows the results.

PVT Measuring Method:

PVT was measured using a PVT measuring machine (made by SWO Corp.) under following conditions in a constant pressure cooling test. Measurement was performed under conditions of a measurement temperature range of 40° C. to 360° C., a cooling rate 5° C./minute, and pressure levels 20, 40, 80, 120, 160 MPa, a value at 0.1 MPa was calculated from the obtained result, and, subsequently a coefficient of volume expansion on the basis of 50° C. was obtained.

Comparative Example 2

A powder of resin obtained in Manufacturing example 5 was pelletized at 350° C. using a twin screw extruder (made by Ikegai Ltd. PCM-30). A specific volume at 0.1 MPa was measured using the PVT measuring machine completely same method as in Example 1 using the obtained pellet. A volume expansion was calculated from a specific volume at each temperature of 100, 150, 200, 250, 300° C. on the basis of a specific volume at 50° C. Table 2 shows the results.

Example 7

The aromatic liquid-crystalline polyester obtained in Manufacturing example 4 was molten within a single screw extruding machine (50 mm of diameter of a screw), was extruded in a shape of a film under a condition of a draft ratio 4 from a T die (a lip length of 300 mm, a lip clearance of 1 mm, a die temperature of 360° C.) of the extruding machine and then cooled to obtain a film with a thickness of 250 μm.

Example 8

The aromatic liquid-crystalline polyester film obtained in Example 7 was compressed with a copper foil having a thickness of 18 μm for 10 minutes at 300° C. and with 30 kg/cm² to obtain a copper foil with a resin layer. A copper foil peel strength (90-degree peeling) of the obtained copper foil with resin layer showed a value of 0.7 N/mm.

Example 9

After 40% by weight of milled glasses (EFH-7501) manufactured by Central Glass Co., Ltd. was blended with the resin obtained in Manufacturing example 4, and mixed. The mixed resin was pelletized at 330° C. using a twin screw extruder (made by Ikegai Ltd. PCM-30). Using a PS40E5ASE type injection molding machine made by NISSEI PLASTIC INDUSTRIAL CO., LTD., under a condition of a cylinder temperature of 340° C., and a mold temperature of 130° C., the obtained pellet was injection-molded to obtain an injection-molded product.

TABLE 2

| | Coefficient of volume expansion (ppm/° C.) | |
|---|---|---|
| Temperature | Example 6 | Comparative example 2 |
| 100° C. | 21 | 197 |
| 150° C. | 58 | 225 |
| 200° C. | 113 | 266 |
| 250° C. | 152 | 320 |
| 300° C. | 206 | 356 |

Example 10

The aromatic liquid-crystalline polyester 5 g obtained in Manufacturing example 6 was dissolved while being agitated at 120° C. into p-chlorophenol 95 g. The obtained solution was measured for a viscosity using a TV-20 type viscometer (4.11 poises, 27° C.). Subsequently, barium titanate (manufactured by KCM Corporation, BT-HP8YF, an average particle diameter of 7 μm) 40 g was added into the obtained aromatic liquid-crystalline polyester solution. The obtained mixed-solution was kneaded and dispersed to obtain a dielectric substance paste. The dielectric substance paste was measured for a viscosity using a TV-20 type visconeter to obtain a value of 94.2 poises (27° C.). The dielectric substance paste was coated on a glass substrate using a bar coater with a thickness of 200 μm, and was dried in a hot wind oven under conditions of: at 80° C. for 1 hour, at 120° C. for 1 hour, at 160° C. for 1 hour, and at 180° C. for 1 hour. As a result, the obtained dielectric film had a flat and smooth surface, and a dielectric film with a uniform film thickness of 17 μwas obtained. The obtained dielectric film were measured for a dielectric constant and a dielectric loss using an impedance material analyzer made by HP to obtain a dielectric constant of 48 and a dielectric loss of 0.022 at 1 GHz.

Example 11

The aromatic liquid-crystalline polyester 3 g obtained in Manufacturing example 7 was dissolved while being agitated at 120° C. into p-chlorophenol 97 g. The obtained solution was measured for a viscosity using a TV-20 type viscometer (127.7 poises, 27° C.). Subsequently, barium titanate (manufactured by KCM Corporation, BT-HP8YF, an average particle diameter of 7 μm) 40 g was added into the obtained aromatic liquid-crystalline polyester solution. The obtained mixed-solution was kneaded and dispersed to obtain a dielectric substance paste. The dielectric substance paste was measured for a viscosity using a TV-20 type viscometer to obtain a value of 148.1 poises (27° C.). The dielectric substance paste was coated on a glass substrate using a bar coater with a thickness of 320 μm, and was dried in a hot wind oven under conditions of: at 80° C. for 1 hour, at 120° C. for 1 hour, at 160° C. for 1 hour, and at 180° C. for 1 hour. As a result, the obtained dielectric film had a flat and smooth surface, and a dielectric film with a uniform film thickness of 26 μm was obtained. The obtained dielectric film were measured for a dielectric constant and a dielectric loss using an impedance material analyzer made by HP to obtain a dielectric constant of 47 and a dielectric loss of 0.024 at 1 GHz.

In the above Examples, barium titanate was used as a dielectric substance powder, and, in addition, same effects can be obtained using strontium titanate and tantalum oxide.

The present invention provides an aromatic liquid-crystalline polyester having a small dielectric loss in wide frequency region, and an aromatic liquid-crystalline polyester being able to manufacture a film having a small volume expansion by heating.

The present invention further provides a dielectric substance paste for dielectric films having a small dielectric loss.

What is claimed is:

1. An aromatic liquid-crystalline polyester consisting essentially of:
   a repeating unit derived from 2-hydroxy-6-naphthoic acid of 30 to 80 mol %;
   a repeating unit derived from aromatic diol of 35 to 10 mol %; and
   a repeating unit derived from aromatic dicarboxylic acid of 35 to 10 mol %.

2. The aromatic liquid-crystalline polyester according to claim 1, wherein
   the aromatic diol is 4,4'-dihydroxybiphenyl.

3. The aromatic liquid-crystalline polyester according to claim 1 or claim 2, wherein the aromatic dicarboxylic acid is selected from the group consisting of terephthalic acid, isophthalic acid, and 2,6-naphthalene dicarboxylic acid.

4. The aromatic liquid-crystalline polyester according to claim 3, wherein
   the aromatic dicarboxylic acid is isophthalic acid.

5. The aromatic liquid-crystalline polyester according to claim 3, wherein
   the aromatic dicarboxylic acid is 2,6-naphthalene dicarboxylic acid.

6. A film comprising the aromatic liquid-crystalline polyester according to claim 1.

7. A method for producing a film, comprising the steps of:
   dissolving the aromatic liquid-crystalline polyester according to claim 1 in an organic solvent;
   casting a solution obtained; and
   removing the organic solvent.

8. The method for producing a film according to claim 6, wherein the organic solvent includes a phenol compound represented by a following general formula (I):

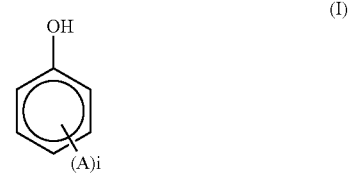

(wherein, A represents a hydrogen atom, a halogen atom or a tri halogenated methyl group, and i represents an integer of 1–5; and when two or more of A exist, A may be mutually identical, or may be mutually different).

9. The method for producing a film according to claim 7, wherein a content of a phenol compound in the organic solvent is not less than 30% by weight.

10. The method for producing a film according to claim 8 or claim 9, wherein
    the phenol compound is a halogen substituted phenol compound.

11. The method for producing a film according to claim 10 wherein the halogen substituted phenol compound is a compound represented by a following general formula (II):

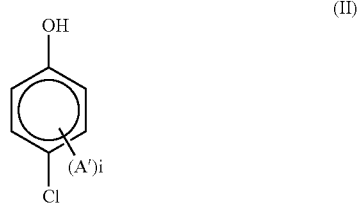

(wherein, A' represents a hydrogen atom, a halogen atom or a tri halogenated methyl group, and i represents an integer of 1 to 4; and when two or more of A' exist, A' may be mutually identical, or may be mutually different).

12. A laminated article comprising a layer comprising the aromatic liquid-crystalline polyester according to claim 1 and a metal layer.

13. A dielectric substance paste comprising the aromatic liquid-crystalline polyester according to claim 1, a solvent, and a dielectric substance powder, wherein
   an amount of the aromatic liquid-crystalline polyester is 0.5 to 50% by weight to an amount of a sum of the aromatic liquid-crystalline polyester and the solvent, and when an amount of a sum of the aromatic liquid-crystalline polyester and the solvent is 100 parts by weight, an amount of the dielectric substance powder is 0.2 to 200 parts by weight.

14. The dielectric substance paste according to claim 13, wherein the solvent containing a phenol compound is a compound represented by a following general formula (I):

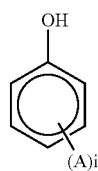
(I)

(wherein, A represents a hydrogen atom, a halogen atom or a tri halogenated methyl group, and represents an integer of 1 to 5; and when two or more of A exist, A may be mutually identical, or may be mutually different).

15. The dielectric substance paste according to claim 14, wherein a content of the phenol compound in the solvent is not less than 30% by weight.

16. The dielectric substance paste according to claim 14, wherein the phenol compound is a halogen substituted phenol compound.

17. The dielectric substance paste according to claim 16, wherein the halogen substituted phenol compound is a compound represented by a following general formula (II):

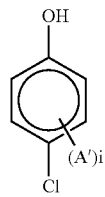
(II)

(wherein, A' represents a hydrogen atom, a halogen atom or a tri halogenated methyl group, and represents an integer of 1 to 4; and when two or more of A' exist, A' may be mutually identical, or may be mutually different).

18. The dielectric substance paste according to claim 13, wherein
   the dielectric substance powder is at least one kind of powders selected from the group consisting of barium titanate, strontium titanate, a solid solution of barium titanate and strontium titanate, and tantalum oxide.

19. The dielectric substance paste according to claim 13, wherein an amount of the dielectric substance powder is 5 to 100 part by weight.

20. A method for manufacturing a dielectric film, comprising the steps of:
   coating the paste according to claim 13 on a substrate; and
   removing the organic solvent.

21. A dielectric film comprising the aromatic liquid-crystalline polyester according to claim 1 and a dielectric substance powder.

22. A laminated article comprising a metal layer and a layer comprising the aromatic liquid-crystalline polyester comprising:
   a repeating unit derived from 2-hydroxy-6-naphthoic acid of 30 to 80 mol %;
   a repeating unit derived from aromatic diol of 35 to 10 mol %; and
   a repeating unit derived from aromatic dicarboxylic acid of 35 to 10 mol % and a metal layer.

* * * * *